UNITED STATES PATENT OFFICE.

JAKOB SCHMID, OF BASLE, SWITZERLAND, ASSIGNOR TO THE SOCIETY OF CHEMICAL INDUSTRY, OF SAME PLACE.

BLUE AZO DYE.

SPECIFICATION forming part of Letters Patent No. 404,309, dated May 28, 1889.

Application filed September 24, 1888. Serial No. 286,240. (No specimens.)

*To all whom it may concern:*

Be it known that I, JAKOB SCHMID, a citizen of Switzerland, residing at Basle, Switzerland, have invented new and useful Improvements in the Manufacture of Blue Coloring-Matters or Dye-Stuffs, of which the following is a specification.

This invention relates to the production of a blue coloring-matter from the azo bodies, resulting from the combination of alpha-diazonaphthaline with alkalized metaamidophenol —such as a dimethyl-metaamidophenol and diethyl-metaamidophenol—which form the subject-matter of a separate application for a patent bearing even date with this and Serial No. 286,239. I have observed that these azo bodies yield, when treated with reducing agents, various bases which readily, by the action of oxygen in the air, condense into coloring-matters. The coloring-matters are still more rapidly formed when oxidizing agents are allowed to act upon the said bases.

Very useful dye-stuffs are obtained from the combination products of the alkalized metaamidophenol with alpha-diazonaphthaline. The reduction of the azo derivatives is easily effected with the generally-used oxidizing agents. A very useful and practical way of proceeding is, for instance, the following: Twenty kilograms of alpha-azonaphthaline-diethyl-meta-amidophenol are dissolved in from sixty to eighty kilograms of glacial acetic acid. To this solution are added ten kilograms of muriatic acid. Afterward zinc dust is added in small quantities and under occasional cooling to the intensely brownish-red colored liquid, until the brownish-red color has almost entirely disappeared. By the reduction the azo body is split in a mixture of alpha-naphthylamine and amidodiethyl-meta-amidophenol, and these two bases remain dissolved in the liquid in form of their chlorhydrates. Then eighty kilograms of water and twenty kilograms of muriatic acid are added, the whole heated for some time at 100° centigrade and filtered off from the unattacked zinc.

The liquid resulting from the above process of reduction is diluted up to about four hundred liters. Then a solution of bichromate of potash containing ten to twelve kilograms of the salt is gradually added, until a test drawn and filtered upon further addition of bichromate of potash and subsequent heating shows no further separation of the blue coloring-matter. The whole is boiled for some time yet, the dye-stuff salted out, filtered when still warm, pressed, and dried. The coloring-matter is purified by redissolving in hot water and salted out with common salt. It represents a dark-blue powder of a metallic luster and appears in the form of its chlorhydrate, which is difficultly soluble in hot water, but easily soluble in alcohol, and gives a greenish-blue color.

The new coloring-matter obtained as above described dyes animal fibers, as well as cotton, prepared with tannin, blue. The blue solutions of the dye-stuffs become discolored upon the addition of a reduction agent. When an oxidizing agent is added, the blue color is immediately recovered.

If alpha-azonaphthaline dimethyl-metaamidophenol is treated exactly in the same manner as the alpha-azonaphthaline-diethyl-metaamidophenol, a blue dye-stuff is produced which closely resembles the dye-stuff above described.

The dye-stuff which is obtained by the reduction of alpha-azonaphthaline-metaamidophenol and subsequent careful oxidation is a violet possessing but little tinctorial power.

What I claim as new, and desire to secure by Letters Patent, is—

The blue dye-stuff or coloring-matter obtained by subjecting the dialkilized azonaphthaline-metaamidophenol to the action of a reducing agent and subsequent treatment with an oxidizing agent, said coloring-matter having the following characteristics: It presents a dark-blue powder of a metallic luster, which is but difficultly soluble in hot water; it dyes blue all animal fibers, as well as cotton prepared with tannin; its blue solution becomes dissolved upon the addition of a reducing agent, but when an oxidizing agent is added the blue color is immediately recovered.

In testimony whereof I have hereunto set my hand in the presence of two subscribing witnesses.

JAKOB SCHMID.

Witnesses:
GEORGE GIFFORD,
CHAS. A. RICHTER.